(12) United States Patent
Johnson (10) Patent No.: US 10,239,634 B2
(45) Date of Patent: Mar. 26, 2019

(54) OLED LIGHTING FOR AVIONIC KEYPANELS

(71) Applicant: Rockwell Collins, Inc., Cedar Rapids, IA (US)

(72) Inventor: Ricky J. Johnson, Shellsburg, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 34 days.

(21) Appl. No.: 15/138,088

(22) Filed: Apr. 25, 2016

(65) Prior Publication Data

US 2017/0305572 A1 Oct. 26, 2017

(51) Int. Cl.
*F21V 9/04* (2018.01)
*B64D 43/00* (2006.01)
*H05B 33/08* (2006.01)

(52) U.S. Cl.
CPC .............. *B64D 43/00* (2013.01); *F21V 9/04* (2013.01); *H05B 33/0896* (2013.01); *B64D 2203/00* (2013.01)

(58) Field of Classification Search
CPC ........ H01L 27/3244; H01L 2251/5338; B64D 43/00; B64D 2203/00; H05B 33/0896; F21V 9/04
See application file for complete search history.

(56) References Cited

U.S. PATENT DOCUMENTS

| | | | | |
|---|---|---|---|---|
| 6,714,186 B1* | 3/2004 | Mosier | ............... | G02B 5/208 250/214 VT |
| 6,803,903 B1* | 10/2004 | Ostergård | ............ | H01H 13/702 200/5 A |
| 7,307,805 B1* | 12/2007 | Sampica | ............... | G02B 5/223 359/350 |
| 7,492,356 B1 | 2/2009 | Pruitt | | |
| 8,232,492 B1 | 7/2012 | Davis et al. | | |
| 2012/0012448 A1* | 1/2012 | Pance | ............... | H01H 13/83 200/5 A |
| 2013/0321277 A1* | 12/2013 | Ha | ............... | G06F 3/02 345/168 |
| 2015/0241025 A1* | 8/2015 | Steiner | ............... | H01H 13/83 362/23.05 |

* cited by examiner

*Primary Examiner* — Sonji N Johnson (74) *Attorney, Agent, or Firm* — Donna P. Suchy; Daniel M. Barbieri (57) ABSTRACT

An illuminated keypanel includes an input device. The input device has control symbology. The illuminated keypanel also includes an organic light emitting diode (OLED) sheet. The OLED sheet provides illumination to the control symbology of the input device.

20 Claims, 7 Drawing Sheets

OLED LIGHTING FOR AVIONIC KEYPANELS

BACKGROUND

The inventive concepts disclosed herein generally relate to the field of control panel illumination.

Current lighted switch panels (i.e. "keypanels") in aircraft typically use either incandescent lighting or LED lighting. Incandescent lighting is unreliable and requires high power (>12 Watts). Additionally, incandescent lighting requires fragile, expensive "flex" cables to connect to the backlight driver. LED lighting has been used to reduce power and improved reliability, but can require complex and expensive waveguides to provide adequate illumination characteristics, as well as to match a dimming curve of an incandescent lighting scheme. For example, designing and implementing waveguides to direct and balance the keypanel illumination can often be time consuming and expensive, customized tuning is required for each application. Further, the need for a waveguide adds unnecessary thickness to the keypanel assembly, which consumes critical space in a cockpit of an aircraft. In addition, due to the use of common waveguides, it is often difficult to individually illuminate a single key or symbol due to the illumination passing through the common waveguide from multiple LEDs. Further, instead of only illuminating a specific symbol, the use of a common waveguide can cause the level of illumination to vary between different keys or symbols of the keypad, depending on the location of the particular LED providing the illumination. Finally, the use of a common waveguide can make it difficult to illuminate individual portions of the keypanel with different colors, as the common waveguide can cause the different colored illuminations from multiple LEDs to blend together, making tuning individual colors on the keypanel difficult.

Vehicle crewstations and cockpits generally include multiple display and control panels, each with their own lighting. This lighting is generally provided within each display and/or control panel by incandescent lighting or LED lighting. A filter is generally applied to the respective light source to limit the infrared emissions to prevent or reduce interference with a crew's night vision-system, such as night vision goggles ("NVG"). This type of lighting is generally referred to as "panel lighting." Additionally, the crew generally uses a dimming device, such as a rheostat or variable voltage source to adjust the panel lighting brightness. This voltage is generally connected to all control and display units. Since all devices generally use the same kind of lighting device, the brightness among the control and display units generally tracks as the dimming level is adjusted.

In addition to panel lighting, crewstations and cockpits can use multifunction displays ("MFDs") to display essential information. MFDs generally use large-active-area cathode ray tubes ("CRT") or liquid crystal displays ("LCDs") to convey information. These displays generally vary in size from 3"×3" to 8"×20." Since LCDs are a transmissive technology and do not emit light, LCD based MFDs are generally illuminated by a backlight device, such a fluorescent lamps or LEDs, located behind the display.

MFDs typically have illuminated switch panels around the periphery of the CRT or LCD. These panels may have "hard keys," such as rotary knobs or pushbuttons with dedicated functions. The panes may also include "soft keys," which allow for variable functions. Hard keys provide rapid single-action access to major, critical functions. Soft keys are labeled by software in the MFD that draws a word or symbol adjacent to the soft key on the display, to label its functions. A soft key may take on many different functions depending on the MFD software. This allows each soft key to replace hundreds of fixed function switches, thereby significantly reducing the cockpit or crewstation area needed for controls. The use of soft keys in conjunction with MFDs can allow for substantial growth in functions, without adding new control or MFD panels.

Each MFD typically has a brightness control for the display, separate from instrument panel lighting. This is necessary to allow the crew to balance the large, bright display area with the instrument panel lighting for optimum viewing ability under the current lighting conditions. The switch panel brightness is controlled by an instrument panel dimming device.

Furthermore, vehicles such as aircraft must operate under a wide range of lighting environments. Ambient illumination can vary from 0.1 fc to 10,000 fc or more. To accommodate the changes in illumination as the vehicle moves, some MFDs use automatic brightness control ("ABC"). ABC works by measuring the light falling on the switch panel and increasing the LCD or CRT brightness as the ambient illumination increases. This can help to keep the display from "washing out" and losing contrast in bright sunlight.

Illuminated keypanels have been proposed for use in aviation and are discussed in U.S. Pat. Nos. 7,492,356 and 8,232,492, all assigned to the assignee of the present application and incorporated in their entireties herein by reference.

Accordingly, current systems and methods of backlighting avionic keypanels and/or keypads can be unreliable, complex and expensive due to custom requirements for different types of aircraft or other applications. Thus, a simple and cost-effective method of providing backlight to avionic keypanels and/or keypads may be desirous.

SUMMARY

In one aspect, embodiments of the inventive concepts disclosed herein are directed to an illuminated avionics keypanel for a cockpit of an airplane. The illuminated avionics keypanel includes a display and a bezel structure, the bezel structure configured to surround the display. The illuminated avionics keypanel further includes a plurality of input devices disposed in the bezel structure, the input devices having control symbology. The illumination avionics keypanel further includes an OLED illumination panel, the OLED illumination panel comprising a first side, and a second side opposite the first side. The first side of the OLED panel coupled to the bezel structure and having at least one active portion. The illuminated avionics keypanel further includes an overlay adjacent to the second side, the overlay comprising at least one description symbology, and a control circuit configured to provide a control signal to the at least one active portion of the OLED illumination panel. The control signal causes the OLED illumination panel to emit a uniform illumination from the at least one active portion and transmit the uniform illumination to the control symbology and the at least one description symbology.

In a further aspect, embodiments of the inventive concept disclosed herein are directed to a method of illuminating an avionics keypanel for a cockpit of an aircraft. The method includes providing a control signal to an OLED illumination device using a control circuit. The method further includes generating an illumination using the OLED illumination device in response to the provided control circuit. The method also includes transmitting the illumination from the OLED illumination device to a plurality of input devices, the input devices having control symbology.

In a further aspect, embodiments of the inventive concept disclosed herein are directed to an illuminated keypanel. The illuminated keypanel includes an input device, the input device having a control symbology. The illuminated keypanel also including an OLED sheet, the OLED sheet providing illumination to the control symbology of the input device.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Before describing in detail the inventive concepts disclosed herein, it should be observed that the inventive concepts disclosed herein include, but are not limited to, a novel structural combination of organic light emitting diode (OLED) devices, control circuits, input devices, and illuminated bezel assemblies, and not in the particular detailed configurations thereof. Accordingly, the structure, methods, functions, control and arrangement of components, modules, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language of the claims.

Figure 1:
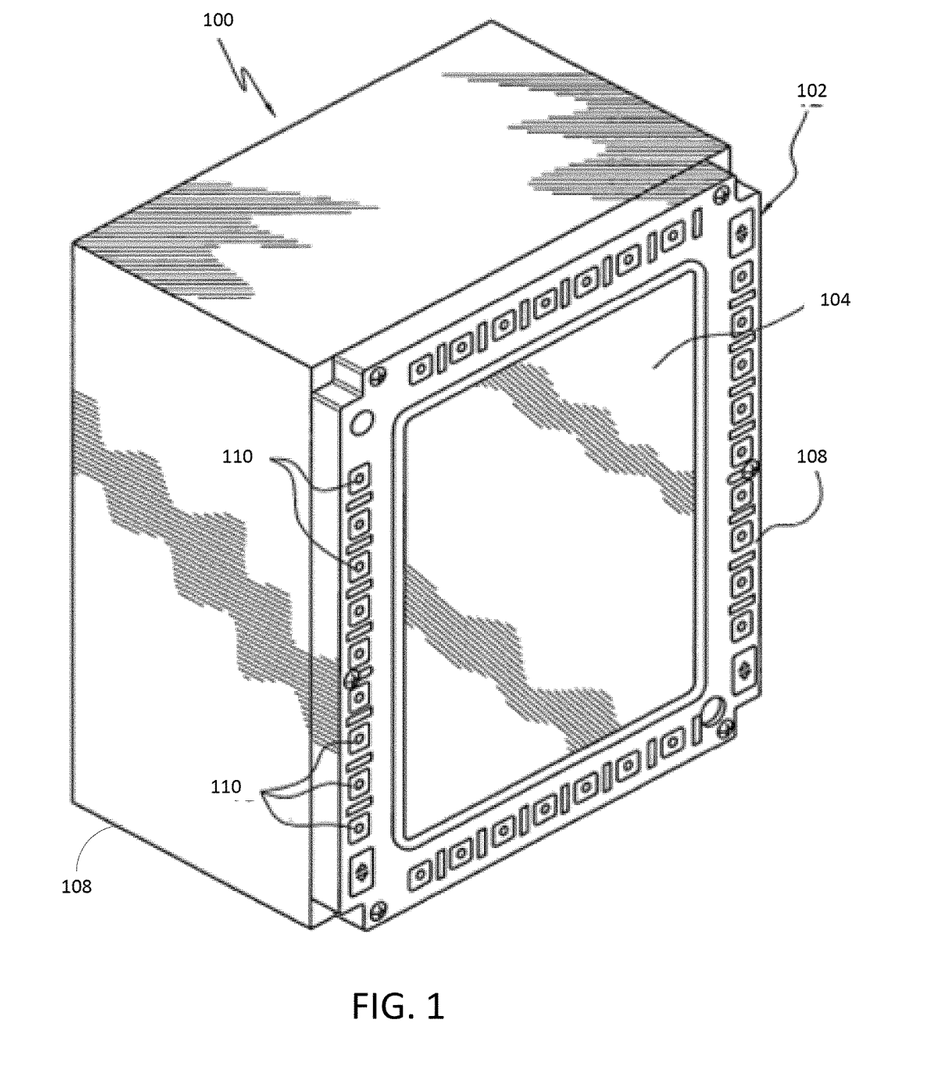
FIG. 1 is a perspective view of a cockpit display assembly incorporating a lighted keypanel according to some embodiments.

FIG. 1 is a perspective view of a cockpit display assembly, designated generally as 100. The cockpit display assembly 100 includes a lighting keypanel 102, and a cockpit display 104 positioned within a central opening of the cockpit display assembly 100. The lighted keypanel 102 includes an enclosure 106 that includes a frame 108. The frame 108 has a number of spaced switch openings for providing access to a number of switches 110. The switches 110 may be hard-key function switches or soft-key function switches. Further, the switches 110 can be one or more of pushbuttons, toggle switches, rotary switches, etc.

Figure 2:
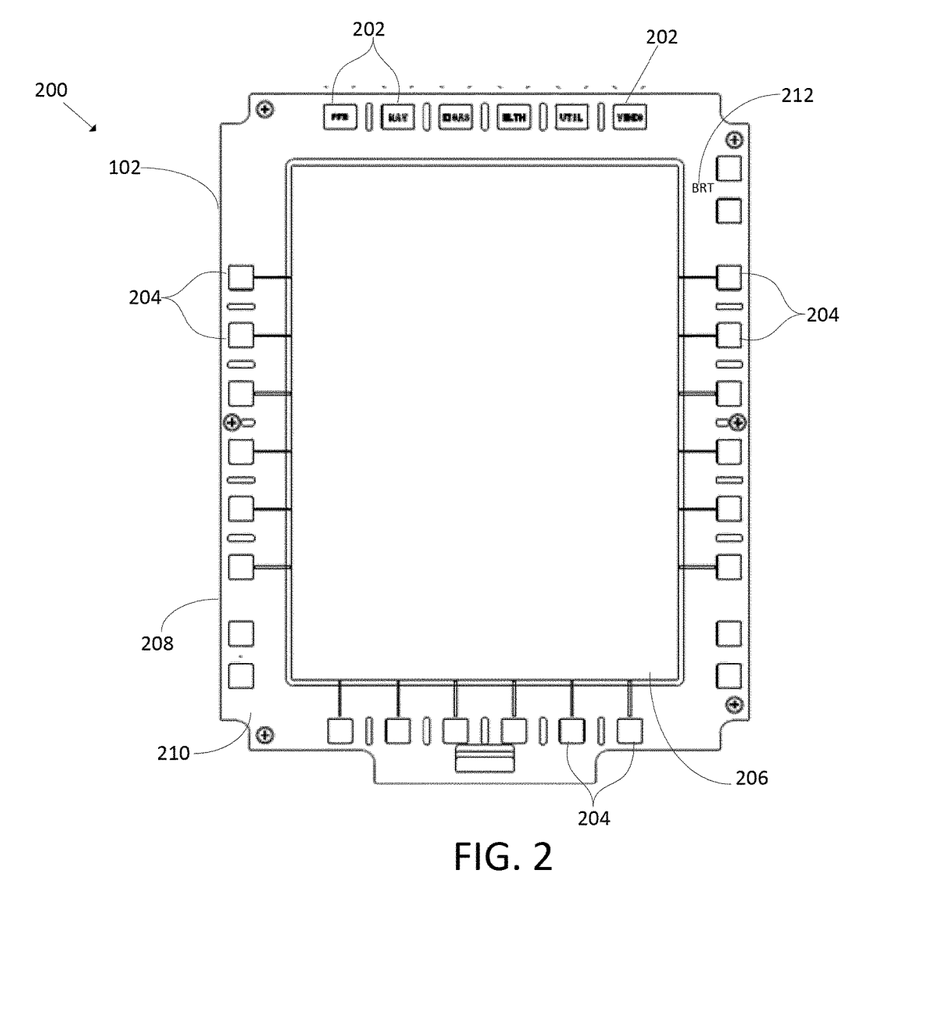
FIG. 2 is a front view of an exemplary avionics keypanel according to some embodiments.

FIG. 2 illustrates a front view of an embodiment of an avionics keypanel 200. The keypanel 200 includes a plurality of input devices, including hard-key function input devices 202 and soft-key function input devices 204. The use of hard-key function input devices and soft-key function input devices will be specific to an individual keypanel, and the layout of the keypanel 200 in FIG. 2 is a descriptive example only. The keypanel 200 further includes a display 206. The input devices 202, 204 are located within a bezel assembly 208, which surrounds the display 206. Additionally, the bezel assembly 208 may include an overlay 210. In one embodiment, the input devices 202, 204 are mechanical input devices such as pushbuttons, mechanical keysets, toggle switches, potentiometers, rheostats, position sensors, DIP switches, or other input devices where mechanical manipulation of the input devices is required. Alternatively, the input devices 202, 204 can be electrical input devices. For example, input devices 202, 204 can be portions of a touch-screen display configured for user inputs, such as capacitive, inductive, resistive, or other types of touch-screen device. Alternatively, the input devices 202, 204 can be a combination of mechanical and electrical input devices.

In one embodiment, the input devices 202, 204 are illuminated. Generally, the input devices 202, 204 are illuminated via a backlighting assembly, which will be discussed in more detail below. However, other illumination methods such as front-lighting can also be used. In some embodiments, only the input devices 202, 204 may be illuminated. However, in other embodiments, the bezel assembly 208 can also have illuminated portions. For example, the overlay 210 of the bezel assembly 208 can be etched to allow illumination to pass through the bezel assembly in the form of a descriptive symbology. In some embodiments, the bezel assembly 208 is constructed of a transparent material, and coated with a non-transparent coating, which is then laser etched to produce a desired descriptive symbology. In an alternate embodiment, the bezel assembly 208 and the overlay 210 are constructed of a transparent material. The overlay 210 is then coated with a non-transparent coating, and the desired descriptive symbologies are laser etched in the non-transparent coating to produce the descriptive symbologies. For example, a descriptive symbology 212 can be seen between on the bezel 208. In this example, the descriptive symbology 212 recites "BRT," which is a shortened symbol for the word "brightness." They symbology 212 can be formed by removing a portion of the overlay 210 in the shape of the desired symbology. The symbology 212 can allow for illumination to pass through the bezel assembly 208 and the overlay 210, thereby allowing the bezel assembly 208 to be marked and illuminated, as applicable.

Figure 3:
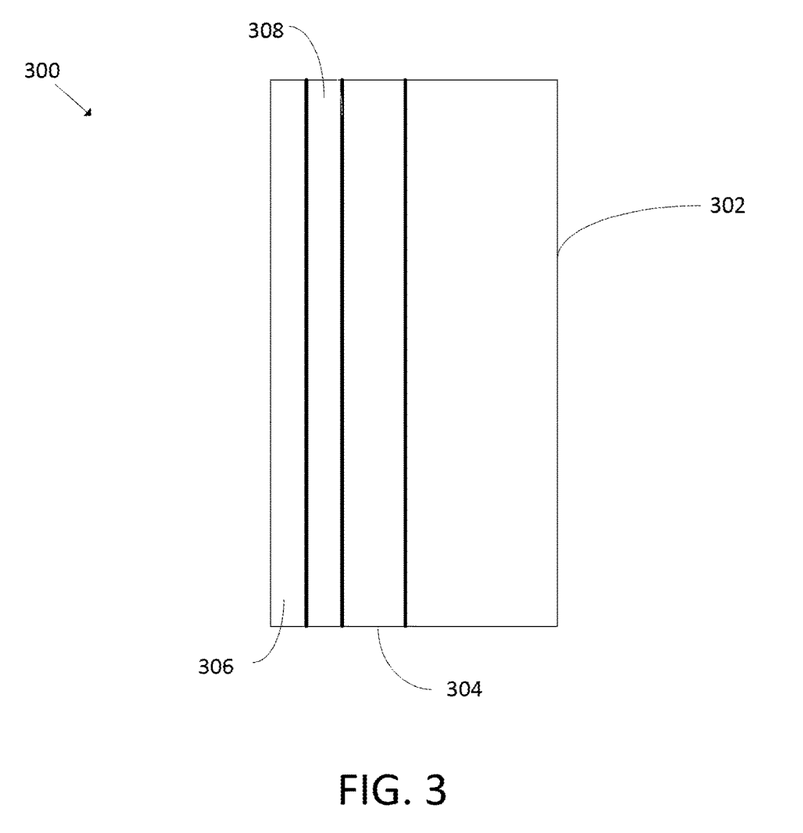
FIG. 3 is a cross-sectional view of a schematic drawing of an OLED backlighting device for a keypad according to some embodiments.

FIG. 3 depicts a cross-sectional view of a keypanel bezel assembly 300 using an OLED backlight. The keypanel bezel assembly 300 includes a bezel structure 302, an OLED illumination device 304 and an overlay 306. The bezel structure 302, the OLED illumination device 304 and the overlay 306 are mounted onto an enclosure, such as enclosure 102 as shown in FIG. 1. In one embodiment, the OLED illumination device 304 is mechanically coupled to the bezel structure 302 via a fastener, such as a clip, a screw, etc.

Further, the bezel structure 302 may be constructed to include features for securing the OLED illumination device 304 to the bezel structure. For example, plastic tabs may be designed into the bezel structure 302 which can be used to secure the OLED illumination device using a clamping force. Other means of coupling the OLED illumination device 304 to the bezel assembly 302 are also contemplated, including adhesive tape, glue, epoxy, etc. In one embodiment, the overlay 306 can be coupled to the OLED illumination device 304 using an adhesive, such as glue or transparent tape. Alternatively, the overlay 306 can be assembled together with the OLED illumination device 404 and the bezel assembly 302, where the bezel assembly 302 is constructed to secure at least one of the overlay 306 and the OLED illumination device 304.

In one embodiment, the OLED illumination device 304 is a thin sheet OLED device. The OLED illumination device 304 can be custom designed for assembly into keypanel bezel assembly 300. In one embodiment, the OLED illumination device 304 is a thin sheet OLED having a thickness of about 2 mm. OLED illumination device 304 can also be a thin sheet OLED having a thickness greater than 2 mm or less than 2 mm. Further, in one embodiment, the OLED illumination device 304 is constructed using rigid OLED panels. However, the OLED illumination device 304 may be constructed using flexible OLED panels in other implementations. For example, flexible OLED panels are useful where the keypanel extends in more than one plane (i.e. the keypanel curves upward or downward), thereby allowing a single OLED panel to be used for the keypanel. The OLED illumination device 304 may include one or more active portions. The OLED illumination device 304 provides uniform illumination across each active portion of the OLED illumination device 304. In some embodiments, the OLED illumination device 304 can provide a uniform illumination across the entire OLED illumination device 304. As used herein, a uniform illumination can mean a uniform intensity and/or color.

The OLED illumination device 304 may be constructed using multiple types of OLEDs. In one embodiment, the OLED illumination device 304 is constructed using active matrix OLED ("AMOLED") technology. Alternatively, in some embodiments the OLED illumination device is constructed using a passive-matrix OLED ("PMOLED"). Additionally, the OLED illumination device 304 can be constructed using bottom emission OLEDs or top emission OLED, depending on the desired application and keypanel construction. The OLED illumination device 304 can further be constructed using transparent OLEDs ("TOLED"), which use transparent or semi-transparent contacts on both sides of the device to create displays that can be made to be both top and bottom emitting. TOLEDs can provide improved contrast, making for easier visibility in bright sunlight. Further, the OLED illumination device 304 can have multiple configurations. For example, the OLED illumination device 304 can provide a simple, single color light, such as white light, across the entire OLED illumination device 304. Alternatively, the OLED illumination device 304 can be configured to allow for multiple colors in the visible color spectrum to be produced by the OLED illumination device 304. In some embodiments, the color can be controlled by an OLED controller circuit.

Additionally, in some examples, the OLED illumination device 304 is divided into multiple, independently controlled active portions, such that the active portions of the OLED illumination device 304 can be controlled individually. In some embodiments, the OLED illumination device 304 is configured such that the individual active portions of the OLED illumination device 304 can correspond with symbologies associated with the overlay 306. For example, the OLED illumination device 304 can be divided into individual active portions that correspond to symbologies on input devices and overlays on a keypanel, such as those described in FIG. 1. This can allow the OLED illumination device 304 to provide individually controlled illumination to each symbology on a keypanel. In some embodiments, the individual segments of the OLED illumination device 304 are controlled to illuminate each associated symbology with a selected color. Further, symbologies can be illuminated, or not, based on whether a function associated with that symbology is currently available to a user. For example, if one or more soft keys, such as 102*m*-102*dd* of FIG. 1 do not correspond to a function for a given application, the segments of the OLED illumination device 304 associated with the symbologies for those soft keys can be turned off. This provides a more definitive user experience, as a user can quickly and easily determine which options are currently available on the keypanel.

As seen in FIG. 3, the overlay 306 is disposed directly against the OLED illumination device 304. Alternatively, the overlay 306 may be disposed adjacent to the OLED illumination device 304, and separated by a pre-determined distance. For example, the overlay 306 may be disposed approximately 1 mm above the OLED illumination device. However, the overlay 306 may be disposed more than 1 mm above the OLED illumination device 304, as required for a given application. In some embodiments, a filter 308 is disposed between the OLED illumination device 304 and the overlay 306. The filter may be a night vision filter to limit the infrared emissions of the OLED to prevent or reduce interference with crew used night vision, such as night vision goggles.

Figure 4:
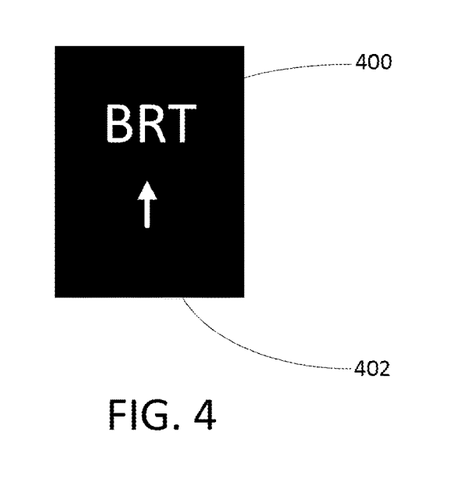
FIG. 4 is a front-facing view of a schematic drawing of a portion of the OLED backlighting device of FIG. 4 according to some embodiments.

FIG. 4 is a front-facing view of a portion of the overlay 306 of FIG. 3. The overlay 306 includes a first symbology 400 and a second symbology 402. The first symbology 400 is shown as the letters "BRT," and the second symbology 402 is generally defined as an arrow. Both the first symbology 400 and the second symbology 402 can be etched into the stencil to allow illumination to pass through. In one embodiment, the overlay 306 is made of a transparent or translucent material with a layer of non-transparent material disposed upon the transparent material. The non-transparent material can then be etched away to form the symbologies 400, 402. Alternatively, the overlay 306 is a single, non-transparent layer of material wherein the material can be removed in the form of the symbologies 400, 402.

Figure 5:
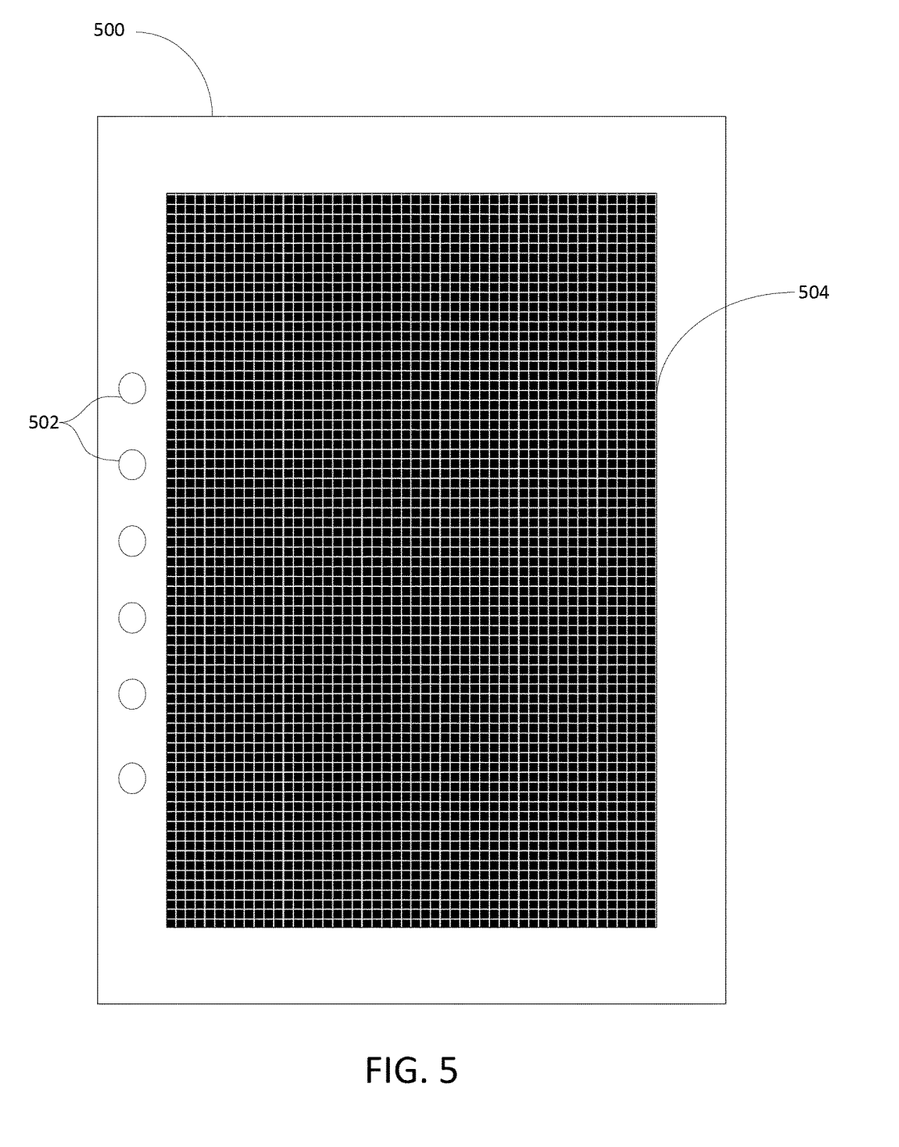
FIG. 5 is a front-facing view of a schematic drawing of an OLED illumination device according to some embodiments.
Figure 6:
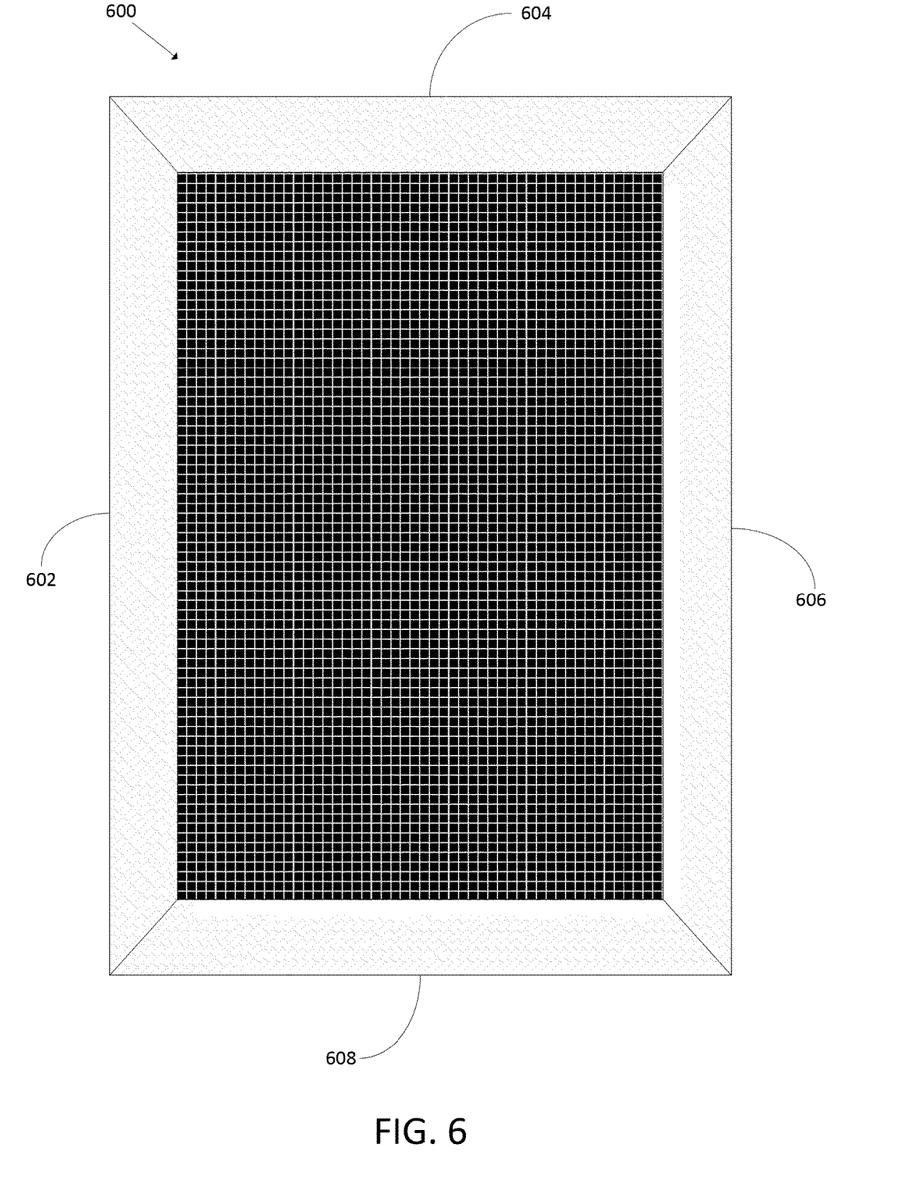
FIG. 6 is a front-facing view of a schematic drawing of a segmented OLED illumination device according to some embodiments.
Figure 7:
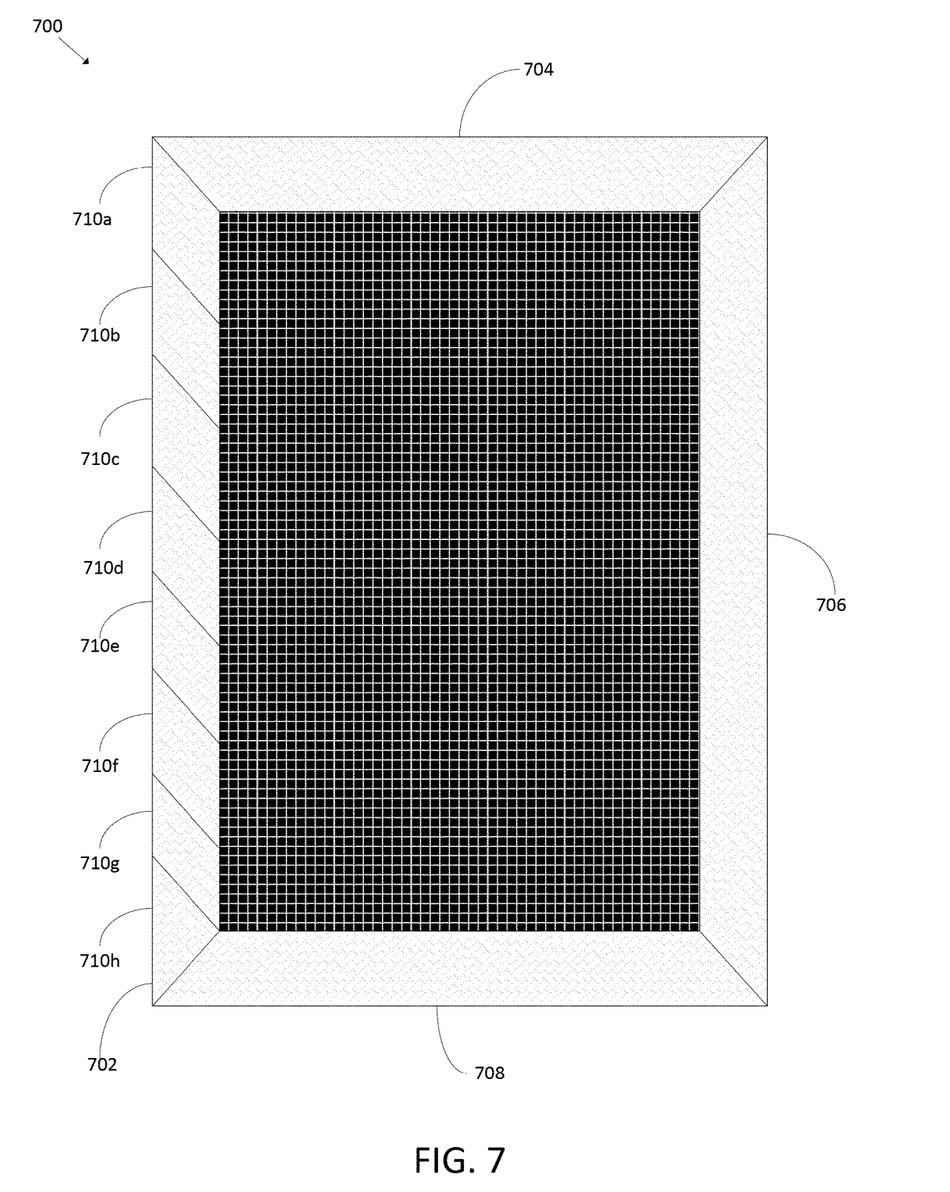
FIG. 7 is a front-facing view of a schematic drawing of a matrixed OLED illumination device according to some embodiments.

Turning now to FIGS. 5-7, multiple OLED illumination panel designs are shown. FIG. 5 is a top view of an OLED illumination panel 500, such as those described above. In the embodiment shown in FIG. 5, the OLED illumination panel 500 is a single, monolithic OLED panel. In one example, the OLED illumination panel 500 is configured to have the same shape as a bezel on a keypanel. In other embodiments, the OLED illumination panel 500 is configured to have a footprint to allow the OLED illumination panel 500 to only be located below the portions of the bezel to be illuminated. As the OLED illumination panel 500 is a single OLED panel, only a single color or brightness level is available for the entire OLED illumination panel 500. For example, if the brightness level of the OLED illumination panel 500 was adjusted using a control circuit (described in more detail below), the entire OLED illumination panel 500 brightness would change.

The OLED illumination panel 500 can include optional through holes 502. The optional through-holes 502 can be positioned below input devices in the keypad, allowing the input devices to pass through the OLED illumination panel 500. For example, input devices, such as input devices 202, 204 shown in FIG. 2, may have transparent plungers that pass through the OLED panel 500, to actuate a switch located below the OLED panel 500. In some embodiments, the switch is located on a circuit board positioned beneath the OLED panel 500. The transparent plungers can serve to funnel the light from the OLED panel 500 to the input devices, in order to provide illumination to the input devices, as needed. In other embodiments, the input devices utilize other types of light guides to funnel the light from the OLED panel 500 through the input devices. The optional through-holes 502 shown in FIG. 5 are exemplary only, and could be configured as needed to correspond to a given application. For example, the through-holes 502 as shown in FIG. 5 are round, but other shapes such as squares, rectangles, hexagons, etc. may also be used. In other embodiments, the OLED illumination panel 500 can be constructed without optional through-holes 502. For example, where a keypanel uses electronic input devices such as capacitive, or resistive touch-controls, no pass through to an underlying circuit board may be necessary, as there is no mechanical switch to actuate. Thus, the OLED illumination panel 500 can be a single piece, and provide illumination directly beneath the electronic input devices.

As shown in FIG. 5, a display 504 is surrounded by the OLED illumination panel 500. As described above, the display 504 can be an LCD display. LCD displays require backlighting to allow the LCD display to be seen. In some embodiments, the OLED panel 500 provides backlit illumination to the display 504. In some examples, a separate OLED panel (not shown) is located below the display 504 to provide illumination to the display 504. Alternatively, the OLED panel 500 can be constructed as a solid rectangular panel to provide both backlit illumination to the display 504 and a bezel. As will be discussed in more detail below, the OLED panel 500 can have a matrix structure, allowing for a single OLED panel 500 to be controlled in various segments. Thus, a single OLED panel 500 may be used for illuminating both the display 504 and a bezel, but still allow for separate brightness control.

FIG. 6 is a top view of a segmented OLED illumination device 600, such as those described above. In the embodiment shown in FIG. 6, the OLED illumination device 600 is constructed using four separate OLED panels 602, 604, 606, 608. In one example, the OLED illumination panels 602, 604, 606, 608 are configured to have the same shape as a corresponding portion of a bezel on a keypanel. In other embodiments, the OLED illumination panels 602, 604, 606, 608 are configured to have a footprints corresponding to the portions of the bezel to be illuminated. The manufacturing and installation of multiple OLED panels 602, 604, 606, 608 may be less expensive than the OLED illumination panel 500 described above. In one embodiment, the OLED panels 602, 604, 606, 608 are each controlled individually. Alternatively, the OLED panels are controlled in groups. For example, OLED panels 602 and 604 can be controlled in a first group, and OLED panels 606 and 608 can be controlled in a second group. However, other combinations are considered. Finally, each OLED panel 602, 604, 606, 608 can be controlled as a single group.

The segmented OLED illumination device 600 is shown to have four segments. However, the segmented OLED illumination device 600 could be constructed with more than four segments, or fewer than four segments. In one embodiment, the segmented OLED illumination device 600 has an OLED segment for each specific item to be illuminated on the bezel, allowing for possible control of each illuminated element on a bezel. For purposes of brevity, the optional through-holes shown in FIG. 5 are not shown in FIGS. 6 and 7; however, it is contemplated that the optional through-holes 502 of FIG. 5 can be applied to any of the OLED illumination devices described herein.

FIG. 7 is a top view of a segmented OLED illumination device 700, similar to the segmented OLED illumination device 600 shown in FIG. 6. As shown in FIG. 7, the segmented OLED illumination device 700 is constructed using four separate OLED panels 702, 704, 706, 708. In one embodiment, OLED panel 702 is a matrixed OLED panel. OLED panel 702 is electrically divided into OLED sub-sections 710a-710h. The sub-sections 710a-710h are matrixed within the OLED panel 702, meaning that each segment 710a-710h is physically located on OLED panel 702, but is able to be independently controlled. Further, different segments 710a-710h can be different colors, allowing for customized illumination patterns. In one embodiment, each segment 710a-710h is associated with a symbology or other item to be illuminated on the bezel and/or keypanel. This can allow for additionally granular control over the OLED illumination device, without having to use multiple OLED panels. Further, as each segment 710a-710h is associated with a given symbology or other item to be illuminated, each illuminated item can be illuminated with a desired individual color. In some embodiments, isolation devices can be installed on a bezel assembly to prevent illumination from one OLED segment 710a-710h from affecting (i.e. illuminating) a symbology associated with a different OLED segment 710a-710h. While OLED panel 702 is shown as being divided into eight sub-sections (OLED subsections 710a-710h), it is contemplated that an OLED panel, such as OLED panel 702, can be sub-divided (i.e. matrixed) into more than eight subsections, or less than eight subsections, as applicable.

For clarity, only OLED panel 702 was described as matrixed, but it is contemplated that some or all of the OLED panels 702, 704, 706, 708 could be matrixed. Further, while the above described matrixed OLED panel is described in relation to a segmented OLED illumination device, such as OLED illumination device 500 of FIG. 5, matrixed OLED panels can also be used with other OLED illumination devices, such as OLED illumination device 600, described above.

Using a matrixed OLED panel, such as that shown in FIG. 7 allows for more flexible control over the illumination of a keypanel. By being able to selectively energize areas of the OLED panel, and thereby illuminate a corresponding selected portion of the bezel, additional information is able to be conveyed to a user. For example, a warning legend (i.e. symbology) can be backlit in red by a corresponding section of OLED panel. Further, the warning legend may only be illuminated when applicable (i.e. the conditions for setting the warning have been met.) Another example is to illuminate only the soft keys that are active for a given display page action or function. This helps to cue the user more rapidly selection the appropriate functions. This is particularly useful when a display is filled with text. Further, as each symbology may be illuminated only by a corresponding OLED segment 710a-710h, the color of an individual symbology is not affected by other OLED segments. For example, a symbology associated with OLED segment 710c may be desired to be illuminated using the color red. As each OLED segment 710a-710h is controlled individually, and illuminates only its respective symbology, the symbology associated with OLED segment 710c can be illuminated red without affecting the color of the illumination provided to the symbologies associated with neighboring OLED segment 710b and OLED segment 710d (e.g. white).

Figure 8:
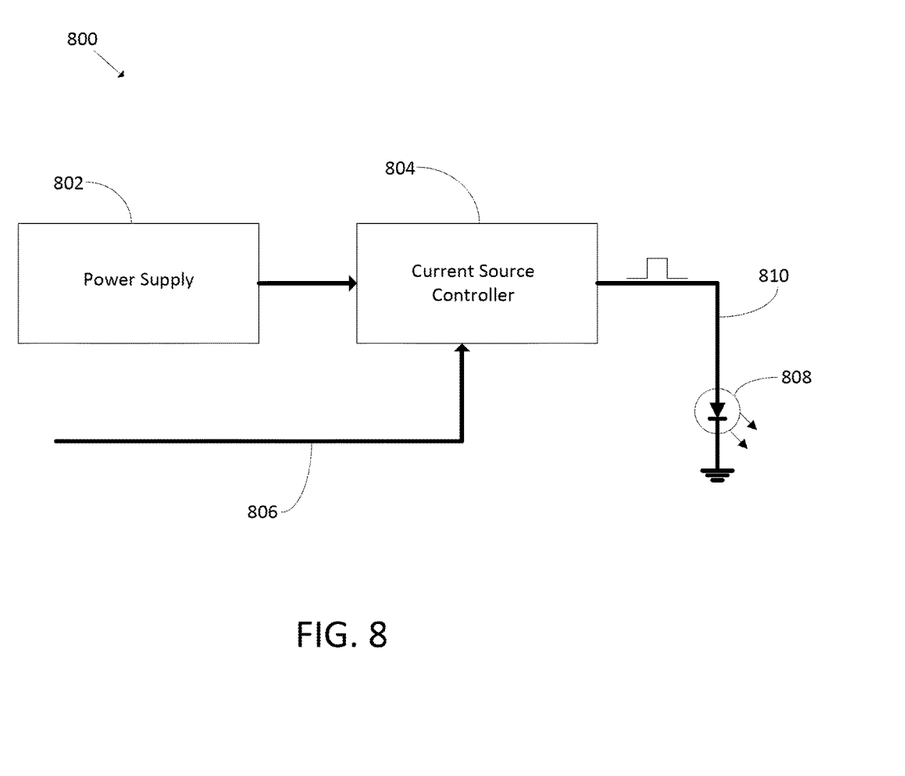
FIG. 8 is a schematic view of a schematic drawing of an OLED driver circuit according to some embodiments.

FIG. 8 is a schematic view of a control circuit 800 for controlling an OLED illumination device, such as those described above. The control circuit 800 includes a power supply 802, a current source controller 804, a command data line 806 and an OLED illumination device 808. The power supply 802 provides a DC output to the current source controller 804. In one embodiment, the power supply 802 is an AC to DC converter, converting an AC voltage to an acceptable DC voltage. For example, the power supply 802 can convert 115 VAC at 400 Hz to a required DC voltage, such as 5 VDC, 12 VDC, 24 VDC, etc. In some embodiments, the power supply 802 is a DC to DC converter, converting one magnitude of DC voltage to a desired magnitude of DC voltage. For example, the power supply 802 can convert 28 VDC to 5 VDC.

The current source controller 804 can control the amount of current going to the OLED device 808 based on an input signal from command data line 806. The command data line 806 can present a data value to the current source controller 804 from an illumination controller (not shown). In one example, the data value can be an analog value (0-5V, 4-20 mA, etc.) Alternatively, the data value can be a digital value. In one embodiment, the data values transmitted on the command data line 806 are interpreted by the current source controller 804 to determine a desired brightness of the OLED device 808. However, other data commands such as desired color are also contemplated. The current source controller 804 outputs a current-limited output signal to the OLED device 808. In one embodiment, the current source controller 804 outputs a pulse-width modulated ("PWM") output to the OLED device 808 via communication line 810. The PWM output can regulate the amount of current provided to the OLED device 808 by increasing or decreasing the duty cycle of the PWM signal, thereby regulating the illumination intensity (i.e. brightness) of the OLED device. For example, the greater the duty cycle, the brighter the OLED device 808 will illuminate, due to the increased current.

The control circuit 800 is shown as controlling a single OLED device 808. In some embodiments, the control circuit 800 controls an entire OLED illumination device, such as illumination device 500 described above. Alternatively, the control circuit 800 controls one or more individual OLED segments, such as those shown in FIG. 6. In one example, each segmented OLED panel 602, 604, 606, 608 is controlled by a separate control circuit, such as control circuit 800. Alternatively, two or more of the segmented control panels 602, 604, 606, 608 are controlled by a single control circuit 800. Finally, a control circuit 800 controls a brightness of a single subsection of a matrixed OLED device, such as that described above in relation to FIG. 7. This allows each individual subsection of the OLED panel to be independently controlled by an individual control circuit, allowing for more flexible control of the illumination within a keypanel, such as those described above. In some embodiments, the current source controller 804 is a part of a microcontroller having one or more PWM outputs for driving multiple OLED panels. Example microcontrollers include PIC controllers, field programmable grid arrays ("FPGA"), programmable logic devices ("PLD"), or other dedicated PWM microcontrollers.

The exemplary embodiments and representations illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

Embodiments of the inventive concepts disclosed herein have been described with reference to drawings. The drawings illustrate certain details of specific embodiments that implement the systems and methods of the present disclosure. However, describing the embodiments with drawings should not be construed as imposing any limitations that may be present in the drawings.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. An illuminated avionics keypanel for a cockpit of an airplane, the illuminated avionics keypanel comprising:
   a display;
   a bezel structure, the bezel structure configured to surround the display;
   a plurality of input devices disposed in the bezel structure, the input devices having control symbology;
   an OLED illumination panel, the OLED illumination panel comprising a first side, and a second side opposite the first side, the first side of the OLED illumination panel coupled to the bezel structure and having at least one active portion;
   an overlay adjacent to the second side, the overlay comprising at least one description symbology;
   a filter disposed between the OLED illumination panel and the overlay;
   a control circuit configured to provide a control signal to the at least one active portion of the OLED illumination panel; and
   wherein the control signal causes the OLED illumination panel to emit a uniform illumination from the at least one active portion and transmit the uniform illumination to the control symbology and the at least one description symbology.

2. The keypanel of claim 1, wherein the OLED illumination panel is an AMOLED illumination panel.

3. The keypanel of claim 1, wherein the control signal is a pulse-width modulated signal.

4. The keypanel of claim 1, wherein the overlay is constructed of a transparent material, and coated with a non-transparent coating.

5. The keypanel of claim 4, wherein the non-transparent coating is laser etched to produce the at least one description symbology.

6. The keypanel of claim 1, wherein the filter is an infra-red filter.

7. The keypanel of claim 6, wherein the overlay is constructed of a transparent material, and coated with a non-transparent coating.

8. The keypanel of claim 1, wherein the OLED illumination panel comprises a plurality of active portions, wherein each active portion is controlled by an independent control circuit.

9. The keypanel of claim 8, wherein each active portion is configured to provide a desired color.

10. The keypanel of claim 9, wherein a first active portion illuminates only a first control symbology associated with the first active portion with the desired color.

11. The keypanel of claim 1, wherein the OLED illumination panel includes a plurality of apertures, the plurality of apertures corresponding to locations of the plurality of input devices to allow an actuator of each of the plurality of the input devices to pass through the OLED illumination panel.

12. The keypanel of claim 11, wherein the actuator is a transparent actuator, the transparent actuator configured to transmit light from the OLED illumination panel to the control symbology.

13. A method of illuminating an avionics keypanel for a cockpit of an aircraft, the method of illuminating comprising:
    providing a control signal to an OLED illumination device using a control circuit;
    generating an illumination using the OLED illumination device in response to the control signal;
    filtering the illumination using an infrared filter, wherein the filtering is performed between the OLED illumination device and the input devices; and
    transmitting the illumination from the OLED illumination device to a plurality of input devices, the input devices having control symbology.

14. The method of claim 13, further comprising controlling an intensity of the illumination using the control signal.

15. The method of claim 13, wherein the control signal causes the OLED illumination device to emit the illumination uniformly from at least one active portion of the OLED illumination device.

16. The method of claim 13, wherein the control signal is a PWM signal.

17. The method of claim 13, wherein the OLED illumination device is an AMOLED illumination panel.

18. An illuminated keypanel, the illuminated keypanel comprising:
    an input device having a control symbology;
    an OLED sheet configured to provide illumination to the control symbology of the input device; and
    a filter disposed between the input device and the OLED sheet, wherein the filter is an infrared filter.

19. The illuminated keypanel of claim 18, further comprising a display; and
    a bezel structure surrounding the display, the input device being disposed in the bezel structure.

20. The illuminated keypanel of claim 18, further comprising:
    a control circuit configured to provide a control signal to at least one active portion of the OLED sheet and
    wherein the control signal causes the OLED sheet to emit the illumination uniformly from the at least one active portion.

* * * * *